Jan. 23, 1962     H. F. SAMPSON     3,017,817
STABILIZING DEVICE FOR UNDERWATER CAMERA
Filed April 6, 1959
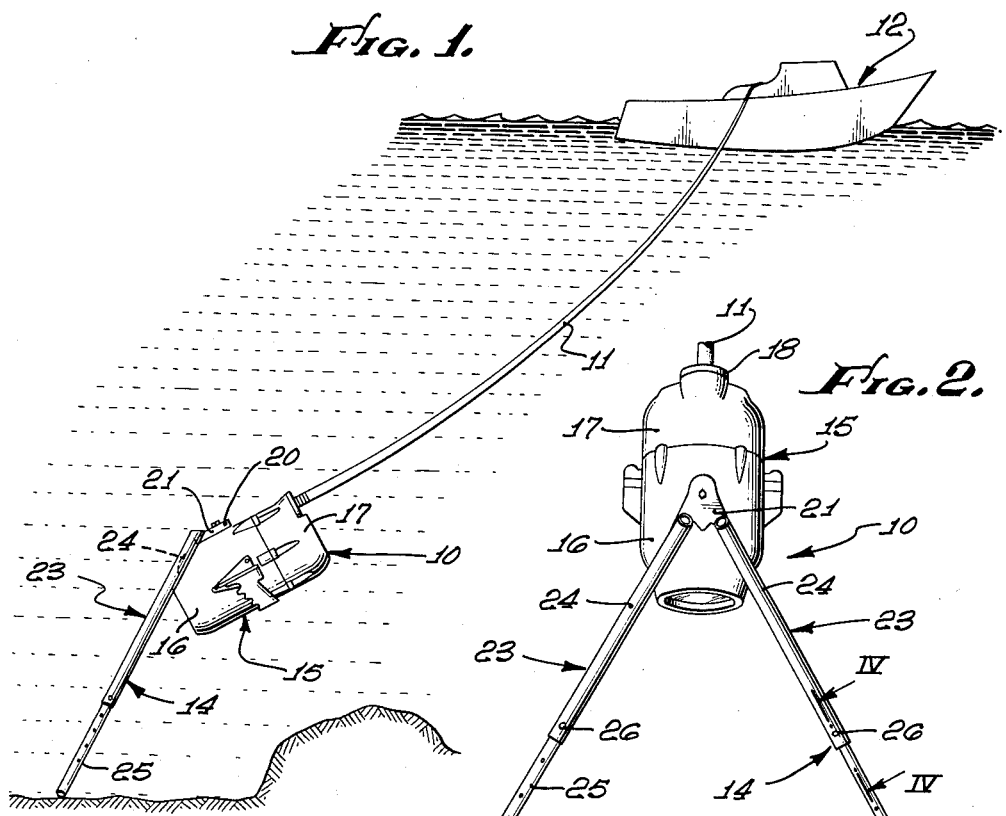
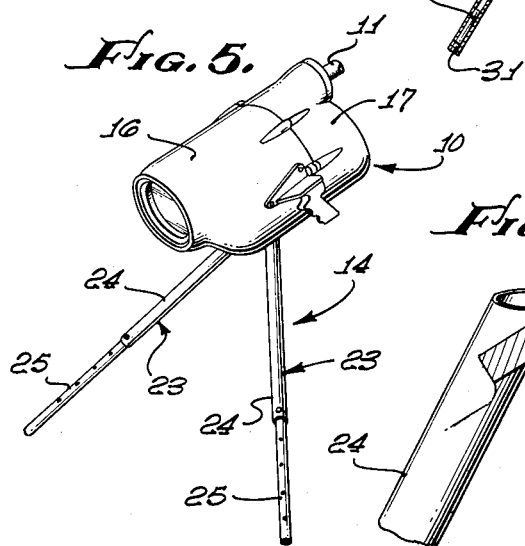
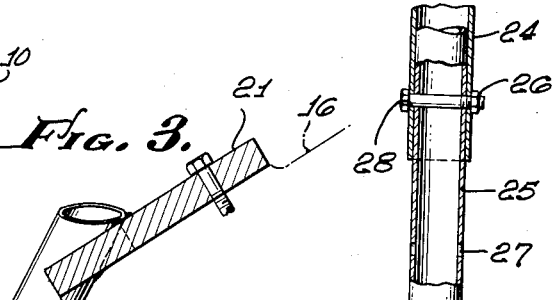
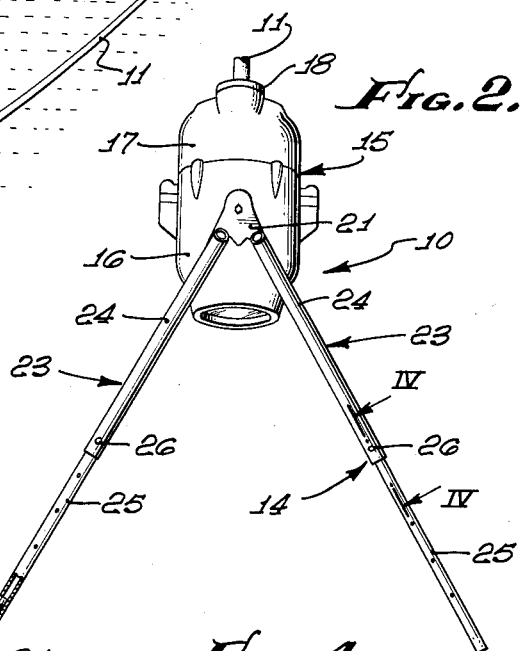
INVENTOR.
HERBERT F. SAMPSON
BY
Miketta and Glenny
ATTORNEYS.

United States Patent Office 3,017,817
Patented Jan. 23, 1962

3,017,817
STABILIZING DEVICE FOR UNDERWATER CAMERA
Herbert F. Sampson, 1604 Newport Blvd., Costa Mesa, Calif.
Filed Apr. 6, 1959, Ser. No. 804,427
6 Claims. (Cl. 95—86)

This invention relates to a stabilizing device for submerged bodies and more particularly to a stabilizing device for underwater cameras, particularly remote controlled television and motion picture cameras adapted to be moved and positioned beneath the surface of a body of water such as an ocean or lake for exploratory scientific purposes or for special photographic purposes.

It is often desirable in underwater photography, particularly television photography, to submerge a television camera at the end of a cable connected at its other end to a surface vessel in order to view at a television monitor or receiver the scene being viewed by the camera at the ocean bottom. In such instances the submerged television camera may be slowly moved through the water just above the ocean bottom or movement may be stopped so that the camera may be positioned adjacent to an object being viewed. The weight of such a submerged camera in water is relatively small and in many instances may be only a few ounces. Such a light, effective weight of a camera attached to the end of a cable connecting the camera to the surface vessel is readily subject to undesirable movement caused by underwater currents, motion of passing sea life, or motion caused by non-uniform irregular changes in tension applied to the cable by the surface vessel. Terrain conditions at the ocean bottom may also affect movement of the camera.

It will be readily apparent that under such conditions as mentioned above that the picture received on the television monitor will rarely be a steady picture capable of being carefully studied and examined because of the uncertain irregular movement of the camera in the water. Prior proposed means for stabilizing a camera attached to the end of a cable have included various devices such as the provision of fins or other like means attached to the camera body. Such prior proposed stabilizing devices included several disadvantages in that the fins tended to collect seaweed and other underwater plant life which ultimately obscured the camera view. Often the fins would become snagged or caught in irregularities on the ocean bottom.

The present invention contemplates a novel construction of a stabilizing device for a submerged body, particularly an exemplary television camera body, wherein the camera is stabilized (that is, irregular motion eliminated or reduced to a minimum) in its movement through the water and is stabilized when it comes to a posiiton of rest or immobility either on the ocean bottom or at a selected spaced distance above the ocean bottom. The stabilizing device of the present invention contemplates a simple effective structure which has been found to effectively steady a submerged camera body against water currents and to protect the camera body from becoming caught upon projections on the ocean bottom and from being damaged thereby. The present invention contemplates, generally speaking, a stabilizing device which may be readily attached to the camera body and which may include a bipod structure comprising a pair of divergently extending leg members lying in a plane intersecting the axis of the camera body. The extremities of the divergent leg members may be equipped with selected weights and the leg members may be provided with means for adjusting the length thereof depending upon the conditions encountered along the ocean bottom and in the water. The bipod legs may be at a selected angle so that the leg structure will not interfere with the angle of view of the camera and so that adequate lateral and longitudinal stability will be imparted to the camera body not only as the camera body moves through the water but also when the camera body is held at rest at a selected depth.

The primary object of this invention, therefore, is to provide a stabilizing device for a body, submerged in water, which may be a camera and which is constructed and arranged in a novel fashion.

An object of the invention is to provide, in combination, a camera body and a stabilizing device therefor whereby the camera body will be held and maintained in a steady fashion regardless of varying underwater conditions.

Another object of this invention is to disclose and provide a stabilizing device for a camera body wherein spaced weights are held in preselected longitudinal and lateral spaced relation to the camera body.

A further object of the invention is to provide a stabilizing device wherein the device may be attached to the camera body in different ways.

These and many other objects of this invention will be readily apparent from the following description of the drawings in which an exemplary embodiment of the invention is shown.

In the drawings:

FIG. 1 is a schematic side view in elevation of an underwater camera equipped with a stabilizing device embodying this invention.

FIG. 2 is an elevational view taken from the front of the device shown in FIG. 1.

FIG. 3 is a fragmentary enlarged view, partly in section, of the attachment means on the device shown in FIG. 1.

FIG. 4 is a fragmentary sectional view of a leg member of the device taken in the plane indicated by line IV—IV of FIG. 2.

FIG. 5 is a perspective view showing the stabilizing device of this invention attached to the camera body shown in FIG. 1 in a different manner.

In FIG. 1 a camera means generally indicated at 10 may be connected to a cable means 11 attached to a vessel or boat 12 at the surface of a body of water such as an ocean in which the camera means 10 is submerged for viewing and exploring objects and underwater life below the surface of the water. The camera means 10 in this example may comprise a television camera or other types of cameras held within a water tight housing adapted to be pressurized and to withstand pressure conditions encountered at 500 to 700 feet of water or less. It is understood that while the device of the present invention is exemplarily illustrated in association with a camera body, that it may be utilized on other types of bodies adapted to be submerged and to be held or moved in a steady fashion in the water.

Camera means 10 may include a camera body or housing 15 adapted to be separated into two body portions 16 and 17. Body portion 17 may be provided with a means 18 for attaching an end of cable means 11 thereto, said cable means 11 comprising in this example a plurality of cables including conductive cables for connection to one or more television cameras, not shown, carried within camera body 15.

A stabilizing device embodying this invention generally indicated at 14 may be attached to camera means 10. One of the body portions, in this example portion 16, may be provided with a flattened surface 20 for seating of an attachment means or attachment plate or member 21 of the stabilizing device 14. While a flattened surface 20 is illustrated, it is understood that any suitable surface may be provided for attachment of device 14 thereto. The attachment member may be of uniform section and of triangular shape.

The stabilizing device 14 may include, in addition to the attachment member 21, a pair of outwardly extending divergently related leg members 23, each leg member being secured at one end to the attachment member 21 in any suitable manner, in this example, as by welding. Each leg member 23 may comprise a selected length of a non-corrosive, non-magnetic metal such as an aluminum alloy. Each leg member 23 may comprise a cylindrical tube or pipe portion 24 secured to member 21 and an extendable reduced diameter cylindrical tube or pipe portion 25 telescopically received within the open end of pipe portion 24. The pipe portion 25 provides an adjustment for the overall length of the leg member 23 by longitudinal adjustment of pipe portion 25 within pipe portion 24. Means for securing the two pipe portions in selected longitudinal relation may comprise a bolt and nut assembly 26 adapted to be inserted through selected pairs of longitudinally spaced ports 27 in the pipe portion 25 and selectively alignable with a pair of ports 28 in pipe portion 24.

The vertex of the V arranged leg members is at the attachment member 21. The V arranged leg members 23 lie in a plane and when attached to the camera body 15, the plane of said leg members may intersect the longitudinal axis of the camera body at an angle of about 30°. The angle of divergence of the leg members 23 may be about 50°. The selection of these angles is not precisely critical and may vary depending upon conditions to be encountered under water.

At the free end of each pipe portion 25 there may be secured or attached in any suitable manner a weight element 30. The weight 30 may comprise lead or other suitable dense heavy material which may be readily secured within the end of pipe portion 25. A plug 31 may close the free open end of pipe portion 25. The weight of element 30 is dependent upon the magnitude of the current in which the camera body is to be submerged and under conditions of a relatively high current the weights 30 should be substantially more than weights required under conditions of low current. It should be noted that the weight elements 30 are disposed in longitudinal and lateral spaced relation with respect to the camera body 15 and that the rigid leg members 23 connect said weights to the camera body in unchanging spaced relation.

In operation of the camera body and stabilizing device described above it will be readily noted from FIG. 1 that the attachment member 21 is connected to the camera body at the top thereof and that the legs extend downwardly and outwardly in a direction opposed to that in which the camera body is being pulled by the cable 11 and vessel 12. The weights 30 at the ends of the leg members 23 are relatively widely spaced apart and follow the camera body in longitudinal spaced relation.

The angle of the optical axis or the longitudinal axis of the camera body with respect to a horizontal plane is determined by the scope or length of the cable 11. That is, if the cable 11 is relatively short, the longitudinal axis of the camera body will be at an angle of approximately 40° or 60° as generally illustrated in FIG. 1, such angle being determined in part by the selected weights at the ends of leg members 23. In the event the longitudinal axis of the camera body is desired to be more nearly horizontal or at an angle 20° to 30°, lengthening of the cable 11 will tend to decrease the angle that the longitudinal axis of the camera body makes with a horizontal plane. Thus the extent of the scene or objects being viewed by the camera lens may be conveniently varied.

FIG. 1 illustrates the stabilizing device with the ends of leg members 23 resting on the ocean bottom. In such position of rest the leg members serve to space the camera body from the ocean bottom and also serve to hold the camera body against lateral movement caused by underwater conditions. Longitudinal movement of the camera body is steadied because of the position of the weights 30 in a remote spaced relation with respect to the camera body and the cable connection at the opposite end of the camera body. In such position of rest it will be readily apparent that the camera body is held in a stable, virtually immobile fashion.

This result is also achieved when the legs are not at rest on the ocean bottom as when they may be spaced thereabove by a predetermined distance. Even in such spaced relation of the stabilizing device with respect to the ocean bottom the camera body is not only maintained in a steady stable fashion but the angle of the longitudinal axis thereof with respect to a horizontal plane may be varied by modifying the scope of the cable 10.

When the camera body is moved through the water to explore and search the ocean bottom for a selected object, the bipod-type stabilizing device acts as a stabilizer to provide a drag upon the camera body which serves to reduce to a minimum irregular, non-uniform movement thereof.

In FIG. 5 the camera 10 is shown with the stabilizing device 14 attached thereto at the bottom thereof. In the particular construction of the exemplary camera means 10, the body portion 16 may be rotated through 180° relative to the body portion 17 so that the flattened surface 20 will be facing downwardly and at the bottom of the body portion 16. As shown in FIG. 5, the handle grips at opposite sides of the camera body portion 16 have been reversed although this need not be done if it is not desired. When the legs extend divergently downwardly from the bottom of the camera 10, the stabilizing device 14 functions in the same manner as that described above. The leg members 23 provide added protection for the camera body against large objects over which the camera 10 may pass as it is pulled through the water.

The stabilizing device is shown as attached to the camera body at a fixed angle with respect to the longitudinal axis thereof. If desired, this angle may be readily changed by inserting a wedge shaped shim or block between the flatted surface 20 and the attachment number 21.

It will be understood that various changes and modifications may be made in the device described above and all such changes and modifications coming within the scope of the appended claims are embraced thereby.

I claim:

1. In combination with a camera means adapted to be submerged in a body of water: a cable means connected to the camera means and adapted to be varied in length to change the scope of the cable in water; and means to protect and stabilize said camera means in the body of water, said protective and stabilizing means extending from said camera means intermediate ends thereof and in a direction opposite to said cable and having elongated spaced members terminating in longitudinal and lateral spaced relation to the camera means whereby said camera means is selectively positionable at a selected angle and distance above the bottom of said body of water.

2. A combination as stated in claim 1 including means for adjusting the length of said elongated members.

3. A combination as stated in claim 1 wherein said elongated members include rigid portions arranged in extensible relation.

4. In combination with a camera means adapted to be submerged in a body of water and with a cable means attached to one end of the camera means, the cable means being varied in length to change the scope of the cable, the provision of: a pair of leg members arranged in angular divergent relation and having a vertex portion; and means for attaching said vertex portion to said camera means between ends of the camera means, said pair of leg members extending beyond the other end of the camera means and sidewardly beyond the sides of the camera means, whereby said camera means is supportable in stable relation between said leg members and said cable means with its longitudinal axis disposed at an angle with respect to the vertical.

5. The combination as stated in claim 4 including a weight means carried by each leg member in spaced relation to the adjacent end of the camera means.

6. In combination with a camera means adapted to be submerged in a body of water and with a cable means attached to one end of the camera means, the cable means being varied in length to change the scope of the cable means and thereby the angle of attitude of the optical axis of the camera means; the provision of: a pair of leg members arranged in divergent relation and an attachment element interconnecting said leg members at adjacent ends thereof; said camera means including a camera housing wall extending between ends of the camera means; means for attaching said attachment element to said camera means centrally of said housing wall; said pair of leg members projecting beyond the other end of the camera means and laterally outwardly with respect to the longitudinal axis of the camera means; whereby said camera means is supportable in stable relation in a body of water between said leg members and said cable means with the longitudinal axis of the camera means disposed at an angle to a perpendicular extending from the surface of the body of water.

References Cited in the file of this patent

UNITED STATES PATENTS

| | | |
|---|---|---|
| 2,060,670 | Hartman | Nov. 10, 1936 |
| 2,112,449 | Proudfit | Mar. 29, 1938 |
| 2,239,201 | Pyzel | Apr. 22, 1941 |

FOREIGN PATENTS

| | | |
|---|---|---|
| 805,994 | Great Britain | Dec. 17, 1958 |